United States Patent [19]

Johnson et al.

[11] 4,256,395

[45] Mar. 17, 1981

[54] FILM CASSETTE SUPPORT SPRING

[75] Inventors: Bruce K. Johnson, Andover; John B. Morse, Boston, both of Mass.

[73] Assignee: Polaroid Corporation, Cambridge, Mass.

[21] Appl. No.: 61,944

[22] Filed: Jul. 30, 1979

[51] Int. Cl.³ .................. G03B 19/10; G03B 17/00; G03B 17/26

[52] U.S. Cl. ............................ 354/180; 354/202; 354/276

[58] Field of Search ............ 354/174, 202, 275–276, 354/288, 354, 180–182; 352/72, 73, 78 C

[56] References Cited

U.S. PATENT DOCUMENTS

| 3,672,276 | 6/1972 | Erlichman | 354/275 |
| 3,682,076 | 8/1972 | Erlichman | 354/202 |

Primary Examiner—L. T. Hix
Assistant Examiner—Thomas H. Tarcza
Attorney, Agent, or Firm—Alfred E. Corrigan

[57] ABSTRACT

A film cassette supporting spring for permitting the insertion of a film cassette having a first configuration into a film chamber where the spring supports the film cassette in position for the exposure of a film unit contained therein, and for preventing a film cassette of a second configuration from being so positioned. The supporting spring includes a film cassette engaging section located in the path of travel of a film cassette as it is being loaded into the film chamber. A resilient arm is coupled to the engaging section and is adapted to be engaged and deflected by a film cassette, having the first configuration, through a distance sufficient to move the engaging section out of the path of the incoming film cassette.

6 Claims, 6 Drawing Figures

U.S. Patent  Mar. 17, 1981  4,256,395
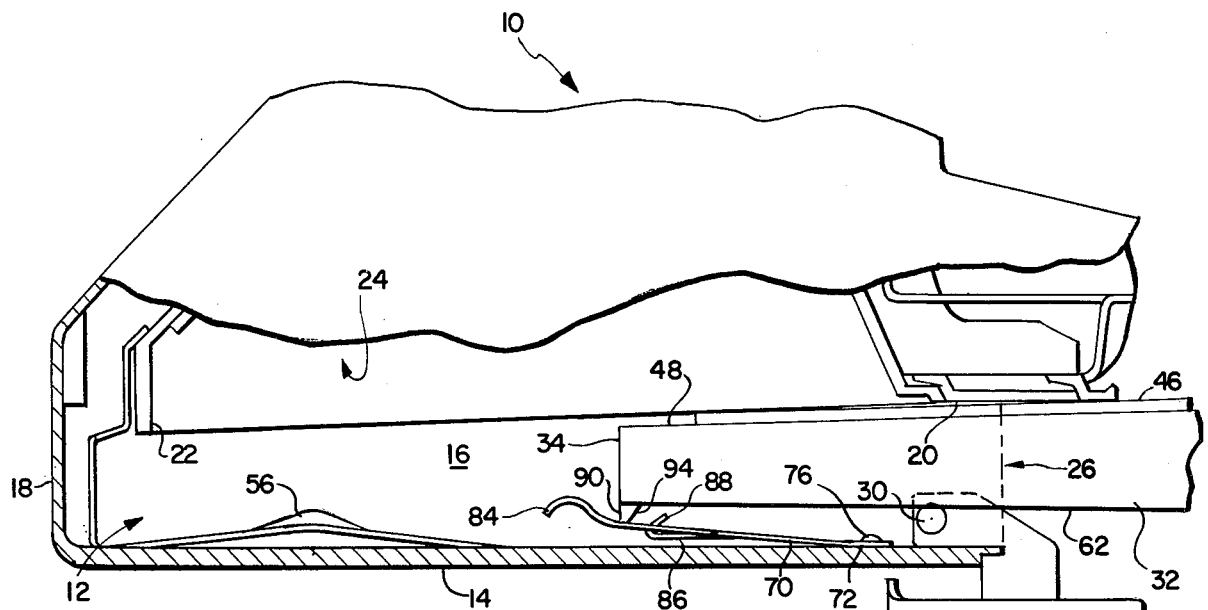
FIG. 1
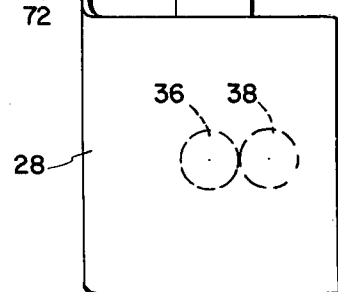
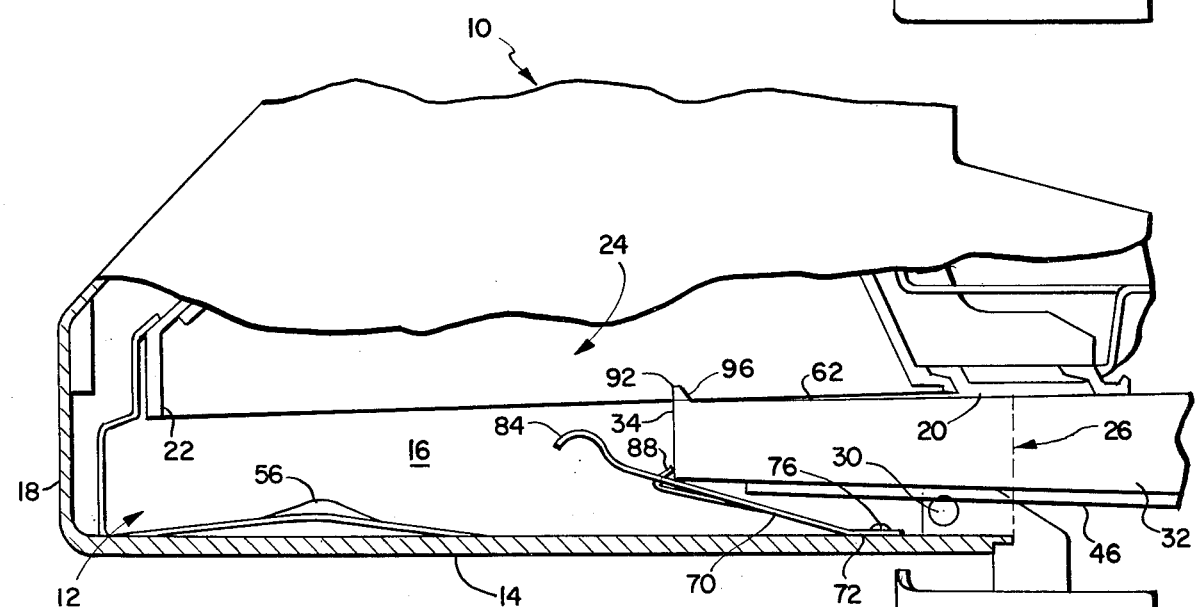
FIG. 3
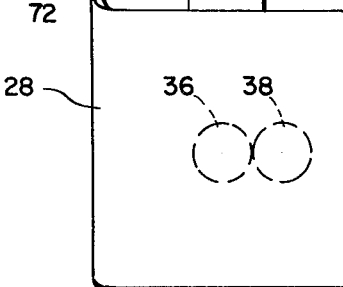

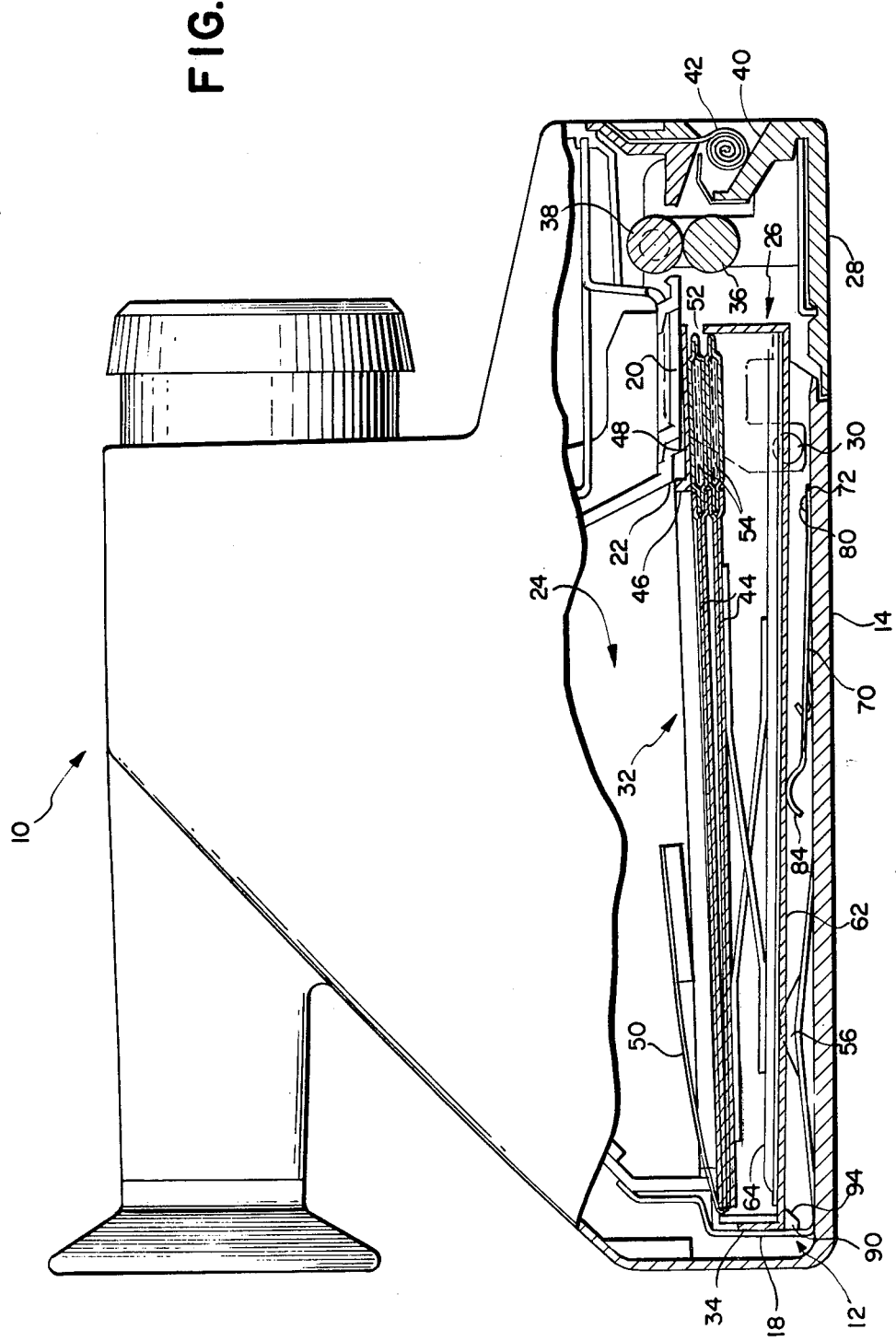

FILM CASSETTE SUPPORT SPRING

BACKGROUND OF THE INVENTION

1. Field of the Invention

This invention relates to a support member for resiliently urging a film cassette of a first configuration into position for the exposure of a film unit contained therein and for preventing a film cassette of a second configuration from being so positioned.

2. Description of the Prior Art

Oftentimes there are occasions when one wants to prevent the full insertion of a film cassette into a film chamber. For example, as taught in U.S. Pat. No. 3,672,276, inadvertent insertion of a film cassette into a film chamber in an upside down manner is precluded by providing the film cassette and the walls of the film chamber with complimentary ribs and grooves. Also, see U.S. Pat. No. 3,682,076 wherein a film cassette supporting spring is constructed to preclude the full insertion of a film cassette into a film chamber in an upside down manner.

It is important that the full insertion of a film cassette into the film chamber of a camera be prevented when one or more of the exposure parameters of the film units located within the film cassette, e.g., film speed, does not correspond with one or more of the exposure parameters of the exposure system of the camera. This is especially true where the film cassette containing the wrong type of film units is very similar to the one which is normally inserted into the camera. Accordingly, it can be seen that there is a need to provide a camera with means for permitting the full insertion into a film chamber of a film cassette containing film units which are compatible with the camera, and for rejecting those cassettes which contain film units which are not compatible with the camera. Preferably, these means should perform a plurality of other functions, e.g., prevent insertion of the film cassette in an upside down manner and support a film cassette in position for the exposure of a film unit located within the film cassette.

SUMMARY OF THE INVENTION

The instant invention relates to photographic apparatus, e.g., a camera or a camera back, having a support member for resiliently urging a film cassette of a first configuration into a position within a film chamber of a camera whereat a film unit located within the film cassette may be positioned for exposure, and for preventing a film cassette of a similar but second configuration from being so positioned. The support member is formed from any suitable resilient material, e.g., spring steel, and has a generally H-shaped configuration. A bracket extends integrally between the bottom ends of the legs of the H-shaped member and provides a means for connecting the support member to a bottom wall of a film chamber having an open end. The two legs of the H-shaped member extend upwardly and away from the open end of the film chamber such that they are located in the path of travel of a film cassette as it is being inserted into the film chamber via the open end. Each leg terminates in a curved end section which functions to (1) engage and support a film cassette of the first configuration in position for the exposure of one of its film units and (2) facilitate the removal of a film cassette should it be inserted too far into the film chamber in an upside down manner. A film cassette engaging member extends in an integral manner away from an arm which integrally interconnects the legs of the H-shaped member and in the direction of the curved end sections of the legs. The free end of the film cassette engaging member is bent back so that it faces generally in the direction of the open end of the film chamber.

A film loading door is pivotally mounted to the film chamber adjacent its open end for movement between an open position wherein a film cassette may be inserted, at least partially, into the film chamber and a closed position wherein it functions to block the passage of light into the film chamber via its open end.

As a film cassette is inserted, trailing end first, into the film chamber, its trailing end engages the legs of the H-shaped member and deflects them downwardly toward the bottom wall of the film chamber. The amount of deflection is a function of the thickness of the film cassette at the point where it engages the legs. Film cassettes of the first and second configurations are generally similar in appearance except that a film cassette of the first configuration has two protuberances extending downwardly from a bottom wall of the film cassette adjacent its trailing end. These protuberances are spaced apart such that each one will engage one of the legs of the H-shaped member and depress it during insertion of the film cassette into the film chamber. The protuberances, in effect, provide the trailing end of the film cassette with a larger thickness as compared with a cassette of the second configuration. This increased thickness is sufficient to deflect the legs of the H-shaped member through a distance which moves the film cassette engaging member out of the path of travel of the film cassette thereby enabling the film cassette to be fully inserted into the film chamber where it is supported by the H-shaped member in position for exposure of one of the film units.

A forward wall of the film chamber is provided with an exposure aperture which is in alignment with an exposure aperture in the film cassette when the latter is located in position for the exposure of one of its film units. When a film cassette of the first configuration is inserted into the film chamber in an upside down manner, the protuberances extend upwardly into the aperture in the forward wall of the film chamber thereby, in effect, giving it an apparent thickness equal to that of a film cassette of the second configuration. Accordingly, the incoming upside down film cassette deflects the legs of the H-shaped member through a distance insufficient to remove the film cassette engaging member from the path of travel of the film cassette. So located, the engaging member engages and prevents further movement of the film cassette into the film chamber while a portion of the film cassette is still located outside of the film chamber. The improper positioning of the film cassette is noted by the user either visually, i.e., by noting that the leading end of the film cassette is protruding from the film chamber, or physically due to his inability to close the film loading door because of the interference of the protruding section of the film cassette.

An object of the invention is to provide a film chamber with a film cassette supporting means for supporting a film cassette of a first configuration in position for the subsequent exposure of one of its film units, and for preventing a film cassette of a similar but second configuration from being so positioned.

Another object of the invention is to construct a film cassette supporting means of the type described with means for preventing the insertion of a film cassette into a film chamber in an upside down manner.

Still another object of the invention is to construct such a film cassette supporting means as a unitary member.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section, of a film cassette of a first configuration shown partially inserted into the film chamber of a camera;

FIG. 2 is a view similar to FIG. 1 showing the film cassette fully inserted into the film chamber and being resiliently supported by a film cassette support spring in position for the subsequent exposure of one of its film units;

FIG. 3 is a view similar to FIG. 1 showing the film cassette of the first configuration being inserted into the film chamber in an upside down manner;

DETAILED DESCRIPTION OF THE INVENTION

Figure 4:
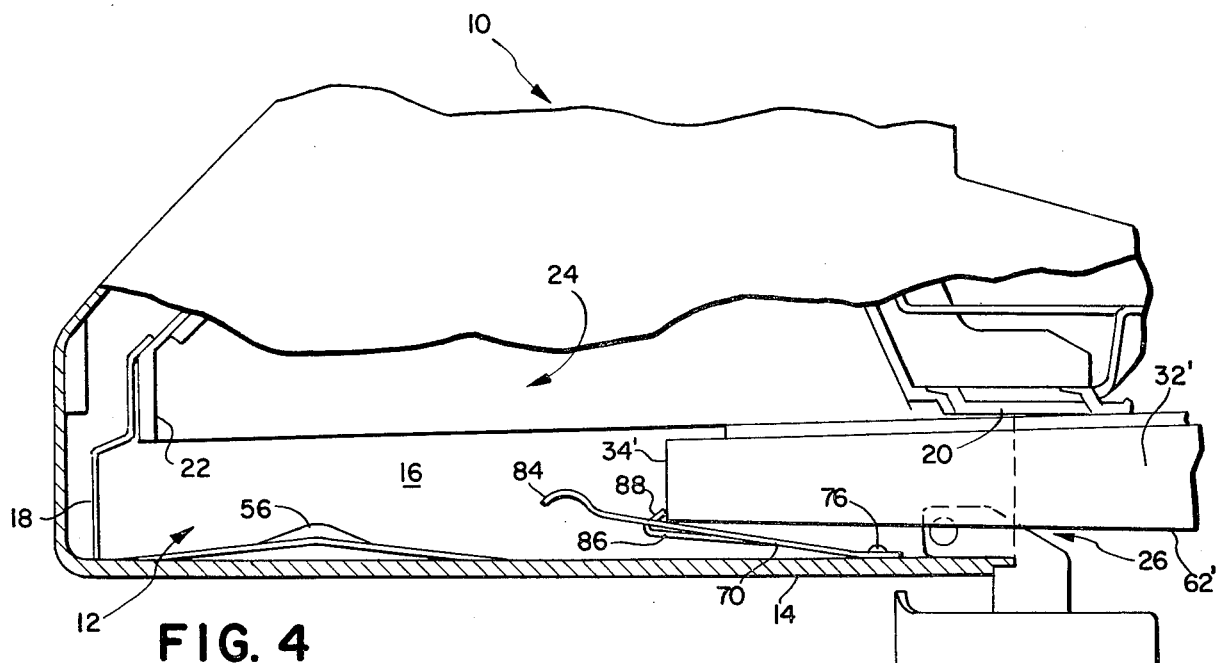
FIG. 4 is a view similar to FIG. 1 showing a film cassette of a second configuration partially inserted into the film chamber of the camera.

Reference is now made to FIGS. 1 and 2 of the drawings wherein is shown photographic apparatus in the form of a camera 10. The camera 10 includes a film chamber 12 defined in part by a bottom wall 14, a pair of side walls 16 (only one being shown), a trailing end wall 18 and a forward wall 20 having an exposure aperture 22 therein for joining the film chamber 12 with the camera's exposure chamber 24. Access to the film chamber 12 is made by way of an open end 26. The open end 26 of the film chamber 12 is normally closed by a housing 28 which is pivotally coupled at 30 to the remainder of the camera 10. The housing or film loading door 28 is adapted for movement between an open position, as shown in FIG. 1, wherein a film cassette 32 may be inserted (at least partially), trailing end wall 34 first, into the film chamber 12, and a closed position, as shown in FIG. 2, wherein it extends across the entire width of the open end 26 to prevent the entry of light therethrough.

As is well known in the art, the housing 28 includes suitable means for rotatably supporting a pair of motor driven rollers 36 and 38, an exit slot 40 and a coiled sheet of opaque material 42 which extends across the exit slot 40. As is more fully described in U.S. Pat. No. 3,940,774, subsequent to the exposure of a film unit 44 through an exposure opening defined by an upstanding rib 46 in a forward wall 48 of the film cassette 32, a film advancing apparatus 50 (see FIG. 2) is activated in a reciprocating manner to move the exposed film unit 44 out of the film cassette 32 via a film unit exit slot 52 and into engagement with the rollers 36 and 38. The rollers 36 and 38 continue the advancement of the exposed film unit toward the exit slot 40 while simultaneously rupturing a container of processing liquid 54 attached to a leading end of the exposed film unit 44 and spreading its contents across the exposed film unit 44 to initiate the formation of a visible image therein. Upon emerging from between the rollers 36 and 38, the leading edge of the exposed film unit 44 is deflected into engagement with the coiled opaque sheet 42. The sheet 42 is uncoiled by the advancing film unit 44 thereby shielding the film unit from the ambient light. When the sheet 42 has been completely uncoiled, it automatically disengages itself from the leading edge of the exposed film unit and returns to its coiled condition wherein it aids in grasping the exposed film unit 44 by its trailing end until it is completely removed from the camera 10 by the user.

A pair of battery contacts 56 (only one being shown) are mounted in side-by-side relation within the film chamber 12. The contacts 56 are positioned so as to resiliently extend into a pair of openings 58 and 60 located in a rear wall 62 of the film cassette 32 so as to engage the terminals of a battery 64 located therein.

Figure 5:
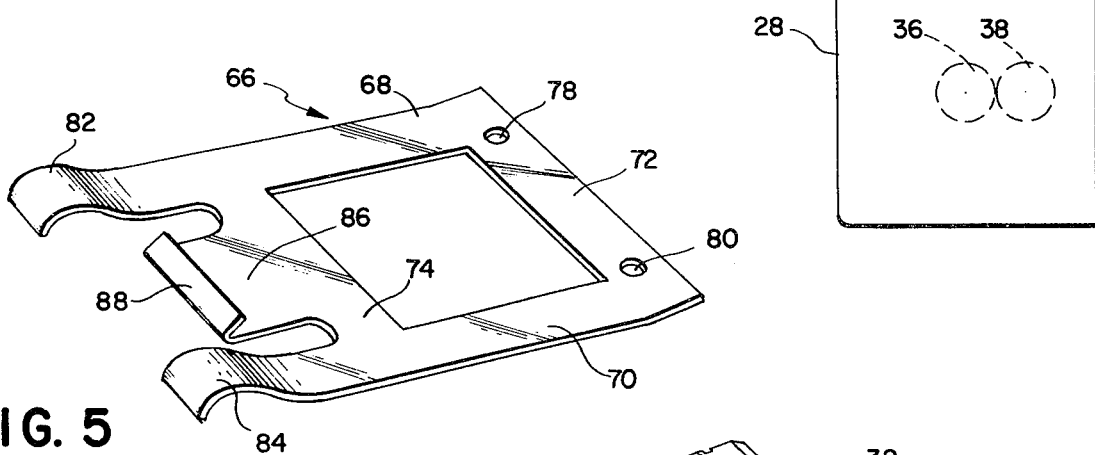
FIG. 5 is an enlarged perspective view of the film cassette support spring.

Also mounted within the film chamber 12 is a film cassette support member 66. As best shown in FIG. 5, the support member 66 is a generally H-shaped member formed from any suitable resilient material, e.g., spring steel. The support member 66 includes a pair of spaced legs 68 and 70 which are integrally interconnected by a pair of arms 72 and 74. The arm 72 provides a means whereby the H-shaped member 66 may be suitably secured to the interior surface of the bottom wall 14 of the film chamber 12, e.g., by rivets 76 which extend through holes 78 and 80 in the arm 72. The legs 68 and 70 extend upwardly from the bottom wall 14 and at an angle of approximately 12° thereto to a position wherein they are located in the path of travel of a film cassette as the latter is being inserted into the film chamber 14. Each of the legs 68 and 70 terminates in a curved end section 82 and 84, respectively, which is adapted to engage and support a film cassette 32 of the first configuration in position for the exposure of one of the film units 44, as shown in FIG. 2.

The H-shaped member 66 also includes a section 86 which extends rearwardly, i.e., away from the open end 26 of the film chamber 14, and then substantially reverses its direction to define a film cassette engaging section 88. As is true with the legs 68 and 70, the film cassette engaging portion 88 is normally located in the path of travel of a film cassette as the latter is being loaded into the film chamber 14.

Figure 6:
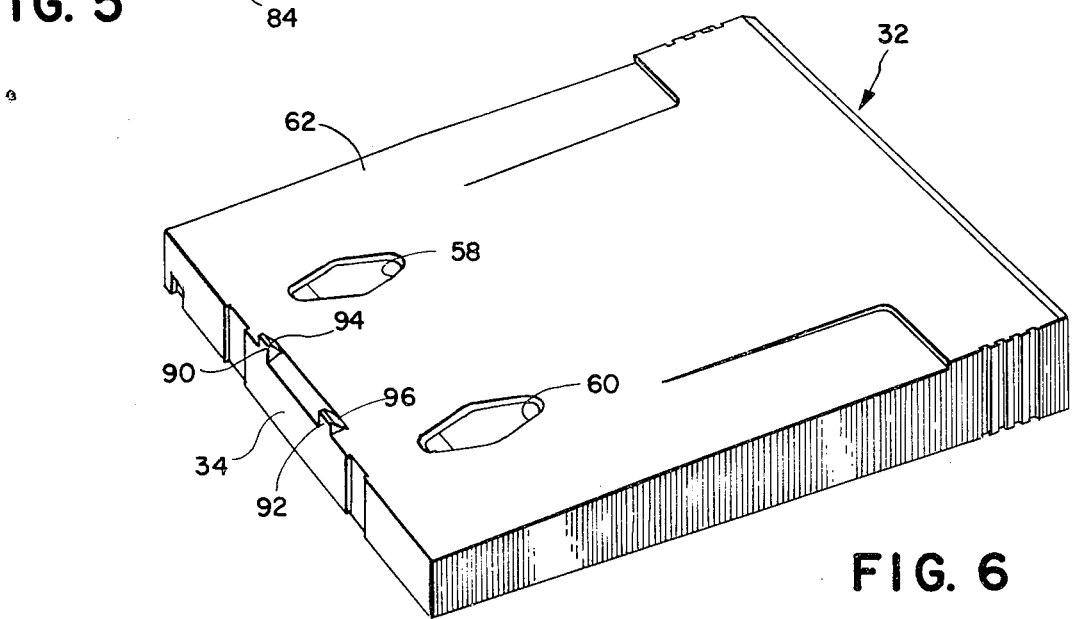
FIG. 6 is a perspective view of a film cassette of the first configuration.

Reference is now made to FIG. 6 wherein is shown a perspective view of the film cassette 32, which, as mentioned hereinbefore, is of a first configuration whereas the film cassette 32', shown in FIG. 4, is of a second configuration. Specifically, the configuration of the film cassette 32 is substantially the same as that of the film cassette 32' except that the trailing end of the film cassette 32 has a greater thickness adjacent its trailing end wall 34 than does the film cassette 32'. This increased thickness may be accomplished in any suitable manner such as by providing the rear wall 62 of the film cassette 32 with a pair of spaced protuberances 90 and 92 each of which has a ramp portion 94 and 96, respectively. The spacing between the protuberances 90 and 92 is substantially equal to the spacing between the legs 68 and 70 of the H-shaped member 66; and the spacing between the side walls 16 of the film chamber 12 is slightly greater than the width of the film cassette 32. Accordingly, when the film cassette 32 is being inserted into the film chamber 12, as shown in FIG. 1, the protuberances 90 and 92 are in alignment with the legs 70 and 68, respectively. Each of the protuberances 90 and 92 is of an equal height, which height is sufficient to deflect the legs 68 and 70 through a distance sufficient to remove the film cassette engaging section 88 from the path of travel of the incoming film cassette 32 before its trailing end wall 34 engages the section 88, thereby permitting the user to continue the insertion of the film cassette 32 into the chamber 12 until it bottoms out at the trailing end wall 18 of the film chamber 12, as shown in FIG. 2. So positioned, the battery contacts 56 extend into the openings 58 and 60 to make electrical engagement with the terminals of the battery 64 and the curved ends 82 and 84 resiliently support the film cassette 32 in position for the exposure of the uppermost film unit 44. The housing 28 may then be rotated into its closed position, as shown in FIG. 2, in preparation for the exposure of said uppermost film unit.

As can be seen in FIG. 3, the H-shaped member 66 also functions to prohibit the full insertion of the film cassette 32 into the film chamber 12. It will be noted in FIG. 3 that a portion of the bottom wall 62 of the film cassette 32 is in engagement with the forward wall 20 of the film chamber 12 while the protuberances 90 and 92 extend upwardly into the exposure aperture 22 in the forward wall 20. This is so because the width of the film cassette 32 is greater than the width of the aperture 22 while the maximum spacing between the proturberances 90 and 92 is less than the width of the aperture 22. As far as the H-shaped member 66 is concerned, the incoming film cassette, whether it actually be of the first configuration (32) or of the second configuration (32'), has an "effective thickness" at its trailing end equal to that of a film cassette of the second configuration. Accordingly, the film cassette 32, when inserted in an upside down manner as shown in FIG. 3, does not have the effective thickness necessary to deflect the legs 68 and 70 of the H-shaped member 66 through a distance sufficient to remove the film cassette engaging section 88 from the path of travel of the incoming film cassette. So positioned, the section 88 engages the trailing end wall 34 of the film cassette 32 and prohibits further movement of the latter into the film chamber. If, for some reason, the film cassette 32 is not stopped by the H-shaped member 66, e.g., manufacturing tolerances of the member 66 or the film cassette 32 are slightly off, it may be inserted into the film chamber 12 until the protuberances 90 and 92 engage the end of the exposure aperture 22 in the forward wall 20. So positioned, the leading end of the film cassette 32 would still be protruding from the open end 26 of the film chamber 12. Also, the curved end sections 82 and 84 would be located within the exposure aperture defined by the upstanding rib 46. When the upside down film cassette 32 is withdrawn from the film chamber 12, the curved end sections 82 and 84 cooperate with the rib 46 to cam the sections 82 and 84 out of the exposure aperture in the film cassette thereby facilitating its withdrawal from the film chamber 12.

As stated previously, if one should attempt to insert a film cassette of a similar but second configuration, i.e., one having a smaller thickness at its trailing end, into the film chamber 12, the H-shaped member 66 would stop it. This is true whether the film cassette 32' is inserted right side up or upside down. FIG. 4 shows the film cassette 32' being inserted into the film chamber 12 in a right side up manner. As the film cassette 32' is moved to the left, its trailing end wall 34' engages the legs 68 and 70 of the H-shaped member 66 and deflects them and the film cassette engaging section 88 downwardly. However, since the bottom wall 62' of the film cassette 32' does not have any protuberances or other means for effectively increasing the thickness of the trailing end of the film cassette 32', the amount of deflection of the legs 68 and 70 is insufficient to remove the film cassette engaging section 88 from the path of travel of the advancing film cassette. Eventually, the trailing end wall 34' of the film cassette 32' moves into engagement with the section 88 thereby preventing further advancement of the film cassette 32' into the film chamber 12.

Since certain changes may be made in the above apparatus without departing from the scope of the invention herein involved, it is intended that all matter contained in the above description or shown in the accompanying drawings shall be interpreted as illustrative and not in a limiting sense. For example, it should be understood that although the H-shaped member 66 has been described and shown as being formed as a unitary member, it is within the scope of the invention to construct it from two or more elements. For example, a first element could contain the legs 68 and 70 while a second element could contain the film cassette engaging section 88. Under this arrangement, the incoming cassette would deflect the first element in a direction toward the second element. If the film cassette were of the first configuration, this deflection would move the first element into engagement with the second element to thereby move the second element out of the path of travel of the film cassette.

What is claimed is:

1. Photographic apparatus comprising:

means for defining a film chamber having an open end through which a film cassette is adapted to be inserted during the loading of the film cassette into said film chamber;

a film loading door mounted adjacent said open end of said film chamber for movement between open and closed positions; and support means secured to a wall of said film chamber so as to extend in cantilever fashion away from said wall and said open end, said support means being mounted in the path of travel of a film cassette as it is being inserted into said film chamber via said open end for resiliently urging a film cassette of a first configuration into a position within said film chamber whereat a film unit located within the film cassette may be positioned for exposure and said door may be moved into said closed position, and for preventing a film cassette of a second configuration from being so positioned, said support means including film cassette engaging means adapted to engage a film cassette of the second configuration by an end wall so as to preclude the full insertion of the film cassette into said film chamber, and resilient means for moving said film cassette engaging means in response to being engaged and deflected by a film cassette, said resilient means being adapted to be engaged and deflected during the insertion of a film cassette of the first configuration through a distance sufficient to move said film cassette engaging means out of the path of travel of the film cassette thereby permitting the full insertion of the film cassette into the film chamber, said resilient means also being adapted to be engaged and deflected during the insertion of a film cassette of the second configuration through a distance insufficient to move said film cassette engaging means out of the path of travel whereby said film cassette engaging means engages the film cassette of the second configuration by the end wall and prevents its full insertion into the film chamber thereby precluding the movement of said door into said closed position.

2. Photographic apparatus as defined in claim 1 wherein said support means is a unitary member.

3. Photographic apparatus as defined in claim 2 wherein said resilient means includes a terminal end which extends in a direction away from said open end and said film cassette engaging means includes a free end which is folded upon itself and which extends toward said open end of said film chamber.

4. Photographic apparatus as defined in claim 3 wherein said terminal end includes a cam surface for facilitating the removal of a film cassette from said film chamber when the film cassette is inserted into the film chamber in an upside down attitude.

5. Photographic apparatus as defined in claim 1 wherein said film cassette engaging means is constructed to preclude the full insertion of a film cassette of either the first or of the second configuration when inserted into said film chamber in an upside down manner.

6. Support means for resiliently urging a film cassette of a first configuration into a position within a film chamber of a camera whereat a film unit located within the film cassette may be positioned for exposure, and for preventing a film cassette of a second configuration from being so positioned, said support means comprising:

means for securing said support means to a wall within the film chamber adjacent an open end thereof so as to extend in cantilever fashion away from the open end and the wall of the film chamber;

film cassette engaging means mounted in the path of travel of a film cassette as it is being inserted into the film chamber, said film cassette engaging means being adapted to prevent full insertion of a film cassette of the second configuration into the film chamber; and resilient means for moving said film cassette engaging means in response to being engaged and deflected by a film cassette, said resilient means being adapted to be engaged and deflected during the insertion of a film cassette of the first configuration through a distance sufficient to move said film cassette engaging means out of the path of travel of the film cassette thereby permitting the full insertion of the film cassette into the film chamber, said resilient means also being adapted to be engaged and deflected during the insertion of a film cassette of the second configuration through a distance insufficient to move said film cassette engaging means out of the path of travel whereby said film cassette engaging means engages the film cassette of the second configuration by an end wall thereof and prevents its full insertion into the film chamber.

* * * * *